United States Patent
Shigeoka et al.

(10) Patent No.: US 7,445,388 B2
(45) Date of Patent: Nov. 4, 2008

(54) BEARING ASSEMBLY WITH ROTATIONAL SPEED DETECTOR

(75) Inventors: Kazuhisa Shigeoka, Iwata (JP); Katsumi Furukawa, Iwata (JP)

(73) Assignee: NTN Corporation, Osaka (JP)

( * ) Notice: Subject to any disclaimer, the term of this patent is extended or adjusted under 35 U.S.C. 154(b) by 306 days.

(21) Appl. No.: 11/324,252

(22) Filed: Jan. 4, 2006

(65) Prior Publication Data

US 2007/0031076 A1 Feb. 8, 2007

(30) Foreign Application Priority Data

Jan. 25, 2005 (JP) ............................. 2005-017031

(51) Int. Cl.
*F16C 32/04* (2006.01)
*G01P 3/48* (2006.01)

(52) U.S. Cl. ....................................... 384/448; 324/173

(58) Field of Classification Search ......... 384/446–448, 384/543–544, 584; 324/173–174, 207.25, 324/207.15; 277/317, 402, 571; 310/45, 310/90.5

See application file for complete search history.

(56) References Cited

U.S. PATENT DOCUMENTS

| | | | | |
|---|---|---|---|---|
| 5,451,869 A | * | 9/1995 | Alff | 324/173 |
| 5,611,545 A | * | 3/1997 | Nicot | 277/402 |
| 5,622,437 A | * | 4/1997 | Alff | 384/448 |
| 5,642,042 A | * | 6/1997 | Goossens et al. | 324/173 |
| 5,762,425 A | * | 6/1998 | Ouchi | 384/448 |
| 5,969,518 A | * | 10/1999 | Merklein et al. | 324/173 |
| 6,176,622 B1 | * | 1/2001 | Nicot | 384/448 |
| 6,211,584 B1 | * | 4/2001 | Kurosawa et al. | 310/45 |
| 6,262,146 B1 | * | 7/2001 | Sakamoto et al. | 523/404 |
| 6,328,476 B2 | * | 12/2001 | Nakamura et al. | 384/448 |
| 6,924,638 B2 | * | 8/2005 | Muramatsu et al. | 324/174 |
| 2004/0108849 A1 | * | 6/2004 | Muramatsu et al. | 324/174 |
| 2006/0279149 A1 | * | 12/2006 | Asper | 310/90.5 |

FOREIGN PATENT DOCUMENTS

| | | | |
|---|---|---|---|
| JP | 6-308145 | | 11/1994 |
| JP | 11080622 A | * | 3/1999 |
| JP | 11279461 A | * | 10/1999 |
| JP | 2004360788 A | * | 12/2004 |
| JP | 2004361230 A | * | 12/2004 |

* cited by examiner

*Primary Examiner*—Marcus Charles
(74) *Attorney, Agent, or Firm*—Wenderoth, Lind & Ponack, L.L.P.

(57) ABSTRACT

A bearing assembly is proposed which includes a rotational speed detector including a sensor and a sensor holder made of steel. The sensor is adapted to be snap-fitted in the sensor holder. The sensor holder is subjected to cationic electrocoating to improve its corrosion resistance, thereby preventing the sensor from separating from the sensor holder after long use of the bearing assembly. This improves the reliability of the entire bearing assembly.

4 Claims, 3 Drawing Sheets

# BEARING ASSEMBLY WITH ROTATIONAL SPEED DETECTOR

BACKGROUND OF THE INVENTION

This invention relates to a bearing assembly including a rotational speed detector for detecting the rotational speed of e.g. a vehicle wheel.

Today's motor vehicles are equipped with various sophisticated control systems including an anti-lock brake system (ABS) for preventing lockup of any wheel of the vehicle during hard braking, a traction control system for preventing slipping of any drive wheel during acceleration of the vehicle, and a car navigation system. In order for these systems to reliably operate, it is necessary to accurately detect the rotational speeds of the respective vehicle wheels. Thus, many of today's motor vehicles include bearing assemblies each carrying a rotational speed detector for detecting the rotational speed of a vehicle wheel.

Such a bearing assembly is disclosed in Japanese patent publication 6-308145A.

The bearing assembly disclosed in this publication includes a stationary outer member having a radially inner surface formed with a plurality of raceways, a rotary inner member having a radially outer surface formed with raceways each radially opposing one of the raceways of the outer member, and a plurality of rolling elements disposed between the radially opposed raceways. The rotary inner member carries a pulse generator, and the stationary outer member carries a sensor arranged to face the pulse generator.

The sensor is snap-fitted to an annular sensor holder fitted on the outer member at its inboard end by pressing.

The sensor holder comprises an annular ring portion fitted on the outer member at its inboard end, and a frame-shaped pocket into which the sensor can be snap-fitted. The pocket includes a clip portion that elastically presses the head of the sensor when the sensor is snap-fitted in the pocket, thereby retaining the sensor in the pocket.

Such a snap-fit type sensor holder is made of steel and is electrogalvanized for improved corrosion resistance. But such an electrogalvanized sensor holder tends to suffer from corrosion at its clip portion after long use. If the clip portion is broken due to corrosion, the sensor may separate from the wheel bearing assembly.

An object of the present invention is to provide a wheel bearing assembly which can reliably prevent separation of the sensor.

SUMMARY OF THE INVENTION

According to the present invention, there is provided a bearing assembly comprising an outer member having a radially inner surface formed with a plurality of raceways, an inner member formed with raceways each radially opposing one of the raceways formed in the outer member, one of the inner and outer members being a stationary member and the other of the inner and outer members being a rotary member, rolling elements disposed between the radially opposed raceways in a plurality of rows, and a rotational speed detector comprising a pulse generator mounted on the rotary member, a sensor holder made of steel and mounted on the stationary member at its outer end, the sensor holder having a pocket, and a sensor pressed into the pocket of the sensor holder, the pocket having a clip portion for holding the sensor in position in the pocket with the center of its back pressed against an outer end face of the stationary member, the sensor holder being provided with cationic electrocoating.

Cationic electrocoating shows far superior corrosion resistance to electrogalvanization, and prevents corrosion of the sensor holder over a prolonged period of time.

The cationic electrocoating thus prevents breakage of the clip portion of the sensor holder due to corrosion, thereby keeping the sensor from separating from the sensor holder over a prolonged period of time. This improves the reliability of the entire bearing assembly.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
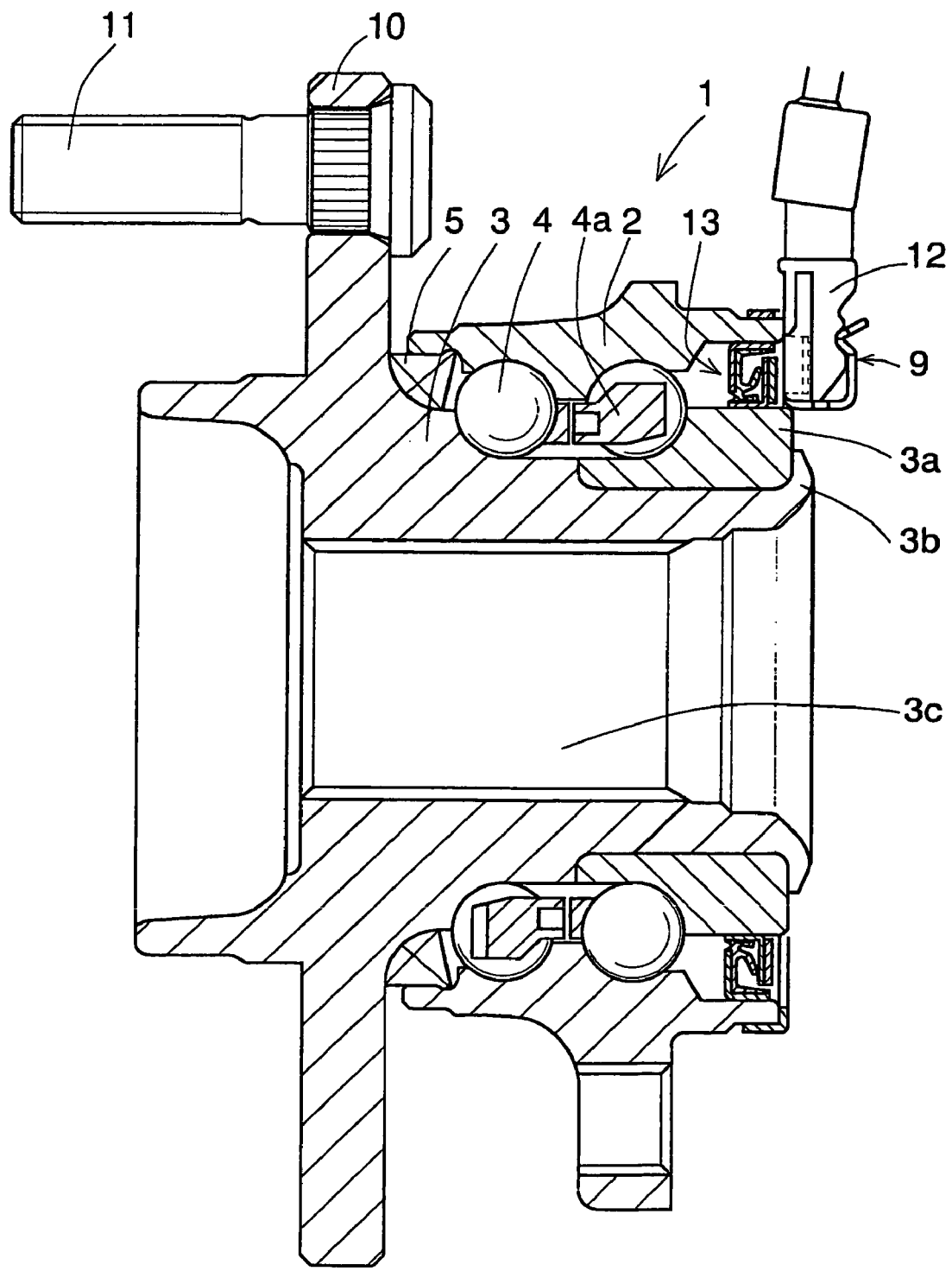
FIG. 1 is a vertically sectional side view of an entire bearing assembly for a drive wheel carrying a rotational speed detector according to the present invention.
Figure 2:
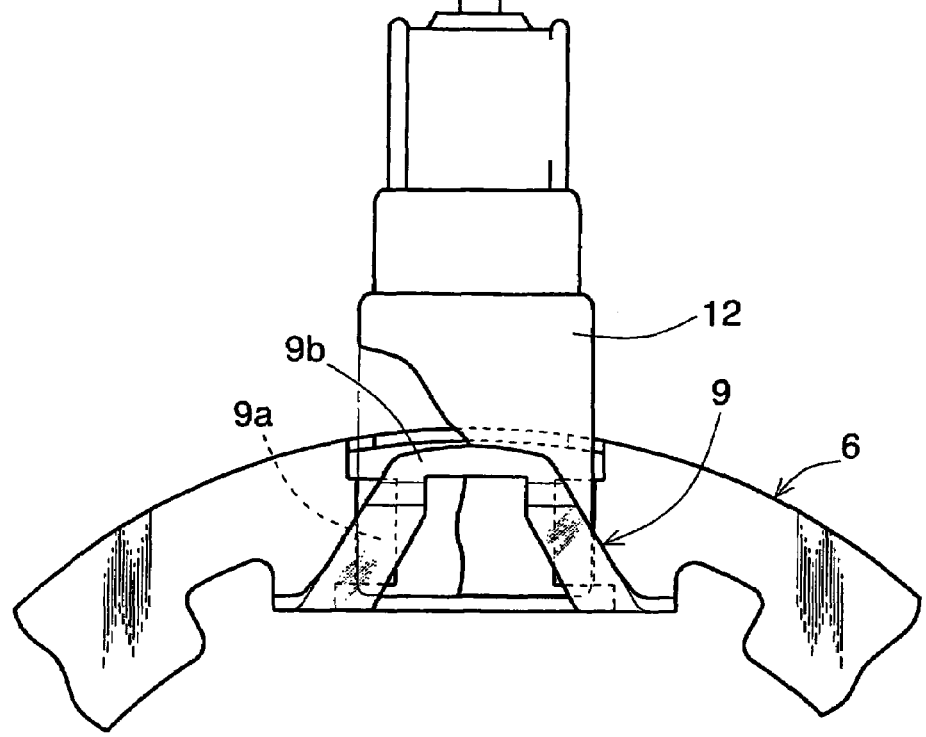
FIG. 2 is a partial front view of the bearing assembly of FIG. 1, showing a pocket of a sensor holder of the rotational speed detector.
Figure 3:
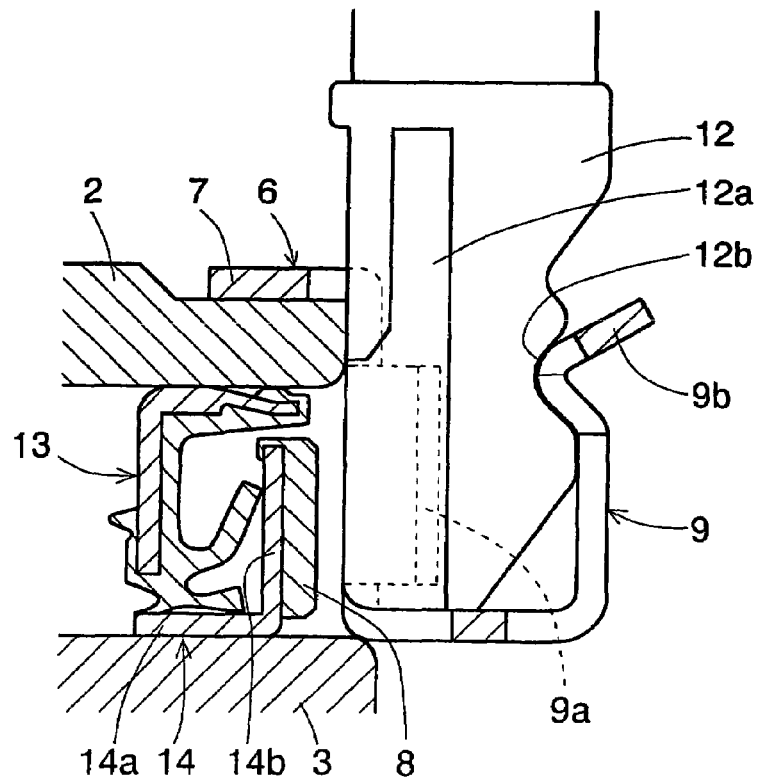
FIG. 3 is a side view partially in vertical section of a portion of the bearing assembly of FIG. 1, showing the pocket of the sensor holder of FIG. 2.
Figure 4:
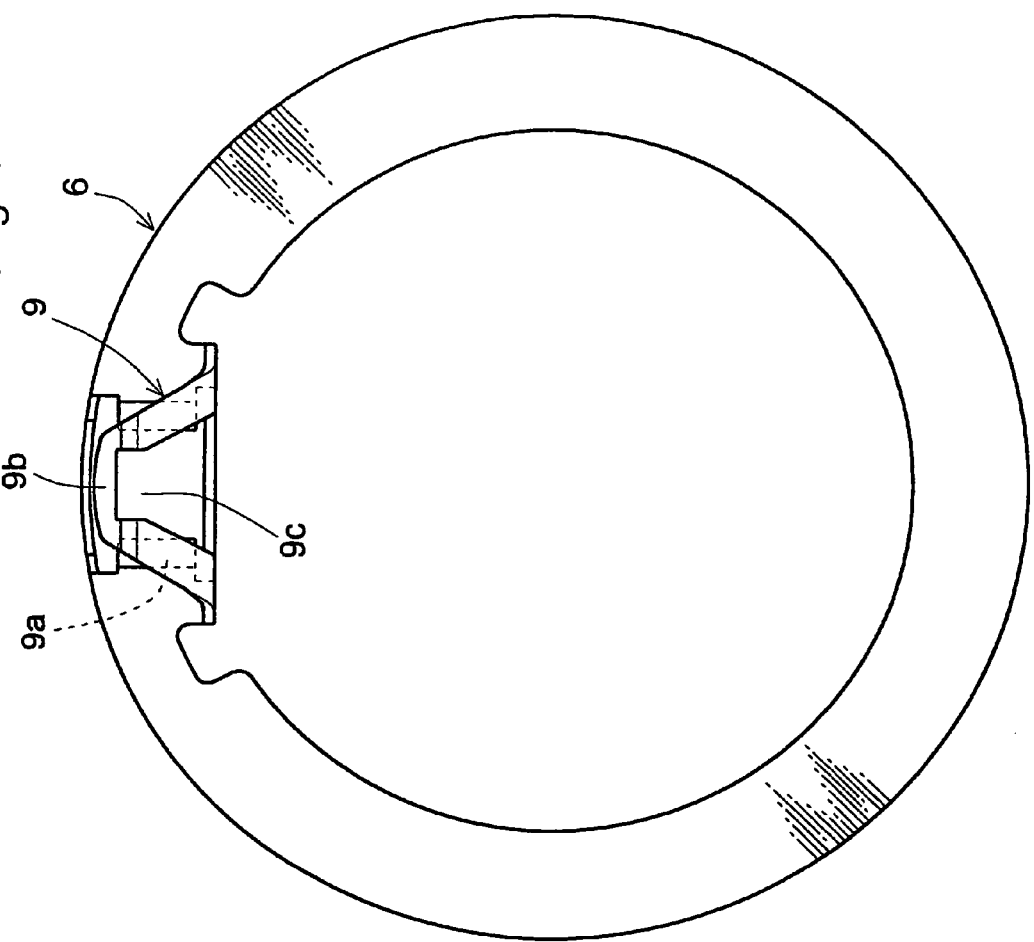
FIG. 4 is a front view of the sensor holder.
Figure 5:
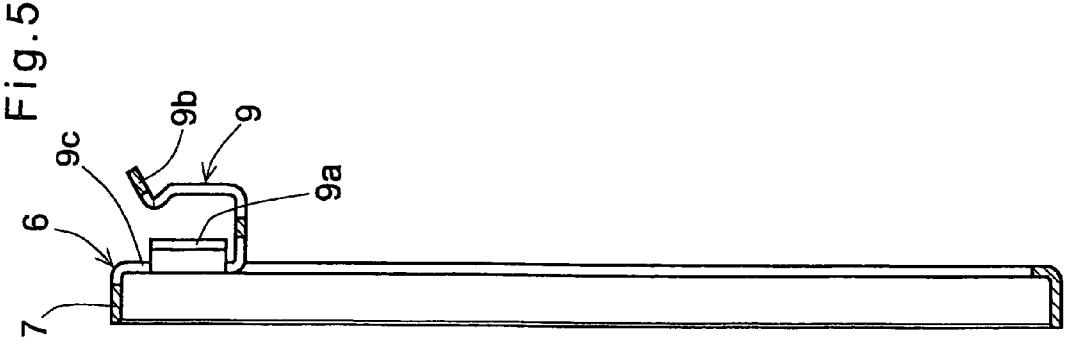
FIG. 5 is a vertical sectional side view of the sensor holder.

FIG. 1 shows a wheel bearing assembly 1 for a drive wheel embodying the present invention. It includes an outer member 2 having a radially inner surface formed with a plurality of raceways, an inner member 3 formed with a raceway radially opposing the outboard raceway of the outer member 2, and an inner ring 3a mounted on the inner member 3 so as to be rotatable together with the inner member 3 and formed with a raceway radially opposing the inboard raceway of the outer member 2. Rolling elements 4 are disposed between the respective radially opposed raceways and are held in position by a retainer 4a. The inner member 3 and thus the inner ring 3a are rotatable relative to the outer member 2. The inner member 3 defines a bore 3c through which a drive shaft extends. The space between the inner and outer members 2 and 3 has its outboard side sealed by an elastic seal and its inboard side sealed by a seal member 13.

An annular sensor holder 6 made of steel is fitted on the outer member 2 at its inboard end. A sensor 12 is press-fitted into the annular sensor holder 6.

The inner member 3 has a wheel mounting flange 10 on its radially outer surface near the outboard end. A vehicle wheel (not shown) is fixed to the wheel mounting flange 10 by hub bolts 11. The outer member 2 is fixed to a suspension (not shown) of the vehicle.

The inner member 3 has its inboard end caulked at its portion 3b to press the inner ring 3a toward the outboard end of the bearing, thereby applying a preload to the rolling elements 4.

A rotational speed detector is mounted on the wheel bearing assembly 1, and comprises a pulse generator 8 mounted on an annular member 14 fitted on the inner ring 3a at its inboard end, and the sensor 12, which is, as described above, fitted in the sensor holder 6 fitted on the outer member so as to oppose the pulse generator 8.

The annular member 14 is formed by pressing a steel plate, and comprises a cylindrical portion 14a pressed on the inner ring 3a at its inboard end and an annular portion 14b bent radially outwardly from the inboard end of the cylindrical portion 14a. The pulse generator 8 is mounted on the inboard side of the annular portion 14b.

The pulse generator 8 may be one of rubber magnets, rolled magnets and sintered magnets having N and S poles alternately arranged at predetermined intervals in the circumferential direction thereof, or may be a member formed with a plurality of windows or cutouts arranged at predetermined intervals in the circumferential direction thereof.

The sensor 12 includes a head having guide grooves 12a formed in both sides thereof and an engaging groove 12b formed in the front side thereof.

The sensor holder 6 is made of steel to which cationic electrocoating is applied, and comprises an annular ring portion 7 fitted on the outer member 2 at its inboard end, and a frame-shaped pocket 9 into which the head of the sensor 12 is fitted.

The pocket 9 has a window 9c formed in its back so as to oppose the pulse generator 8, guide portions 9a formed on both sides thereof and adapted to engage in the guide grooves 12a formed in the head of the sensor 12, and an elastically deformable clip portion 9b formed on the front side thereof and adapted to be fitted in the engaging groove 12b of the head of the sensor 12.

EXPERIMENTAL EXAMPLE

Specimens of the sensor holder according to the present invention, to which cationic electrocoating was applied, and specimens of a conventional electro-galvanized sensor holder were subjected to a corrosion resistance test.

In the corrosion resistance test, based on a neutral salt spray cycle test JASO M609, after spraying 5% sodium chloride NaCl (pH 6.5 to 7.2) kept at 35 degrees C. on each specimen for two hours, the specimens were dried for four hours at 60 degrees C. and at a humidity of not more than 30%. Then, the specimens were left in a humid atmosphere at 50 degrees C. and at a humidity of not less than 95% for two hours. This cycle was repeated 42 times, and the specimens were observed thereafter.

Cationic electrocoating applied to the sensor holder specimens according to the present invention had a thickness of 10 micrometers. Electrogalvanized coating applied to the conventional sensor holder specimens had a thickness of 5 micrometers.

The conventional electrogalvanized sensor holder specimens were corroded to such an extent that red rust was present practically all over their surface. On the sensor holder specimens according to the present invention, to which cationic electrocoating was applied, red rust was scarcely observed.

In the test, two specimens were used for each of the sensor holder according to the present invention and the conventional sensor holder. It is considered that subjecting the specimens to 45 cycles of the abovementioned test is substantially equivalent to leaving the specimens outdoors for one year (in Okinawa, Japan).

The present invention is not limited to the above-described embodiments. Rather, it is to be understood that the present invention encompasses any change or modification that is within the scope of the claims.

What is claimed is:

1. A bearing assembly comprising:
   a stationary outer member having a radially inner surface formed with a plurality of raceways;
   an inner rotary member formed with raceways each radially opposing one of said raceways formed in said stationary outer member, said stationary outer member having a cylindrical radially outer surface at one end thereof;
   rolling elements disposed between said radially opposed raceways in a plurality of rows; and
   a rotational speed detector;
   wherein said rotational speed detector comprises a pulse generator mounted on said inner rotary member, a sensor holder mounted on said stationary outer member, and a sensor having a sensor head mounted to said stationary outer member by said sensor holder;
   wherein said sensor holder includes a cylindrical annular ring portion fitted on said cylindrical radially outer surface of said stationary outer member, and a pocket supported by said cylindrical annular ring portion and configured to hold said sensor head;
   wherein said sensor head is pressed into said pocket of said sensor holder;
   wherein said pocket of said sensor holder has a clip portion configured to hold said sensor head in position in said pocket such that a center of a backside of said sensor head is pressed against said one end of said stationary outer member;
   wherein said sensor holder is formed of steel and is provided with cationic electrocoating.

2. A bearing assembly according to claim 1, wherein
   said sensor head has guide grooves formed in opposite sides thereof;
   said pocket includes guide portions respectively provided on both sides thereof; and
   said guide portions are respectively engaged in said guide grooves of said sensor head.

3. A bearing assembly according to claim 2, wherein
   said sensor head has an engaging groove formed in a front side thereof;
   said clip portion is constituted by an elastically deformable clip portion; and
   said elastically deformable clip portion is engaged in said engaging groove of said sensor head.

4. A bearing assembly according to claim 1, wherein
   said sensor head has an engaging groove formed in a front side thereof;
   said clip portion is constituted by an elastically deformable clip portion; and
   said elastically deformable clip portion is engaged in said engaging groove of said sensor head.

* * * * *